United States Patent
Chae et al.

(10) Patent No.: US 11,063,679 B2
(45) Date of Patent: Jul. 13, 2021

(54) METHOD AND DEVICE FOR PERFORMING SYNCHRONIZATION BY D2D TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 16/070,145

(22) PCT Filed: Jan. 13, 2017

(86) PCT No.: PCT/KR2017/000485
§ 371 (c)(1),
(2) Date: Jul. 13, 2018

(87) PCT Pub. No.: WO2017/123053
PCT Pub. Date: Jul. 20, 2017

(65) Prior Publication Data
US 2019/0020431 A1    Jan. 17, 2019

Related U.S. Application Data

(60) Provisional application No. 62/277,972, filed on Jan. 13, 2016.

(51) Int. Cl.
*H04J 3/06*     (2006.01)
*H04W 56/00*    (2009.01)
*H04W 76/14*    (2018.01)

(52) U.S. Cl.
CPC ......... *H04J 3/0641* (2013.01); *H04W 56/001* (2013.01); *H04W 56/002* (2013.01);
(Continued)

(58) Field of Classification Search
CPC combination set(s) only.
See application file for complete search history.

(56) References Cited

U.S. PATENT DOCUMENTS

2016/0037466 A1* 2/2016 Yang ............... H04W 48/20
370/350
2017/0086158 A1* 3/2017 Feng ............... H04W 56/0015
(Continued)

FOREIGN PATENT DOCUMENTS

KR    1020130029355    3/2013
KR    1020150128426    11/2015
(Continued)

OTHER PUBLICATIONS

PCT International Application No. PCT/KR2017/000485, Written Opinion of the International Searching Authority dated Apr. 4, 2017, 15 pages.
(Continued)

*Primary Examiner* — Mounir Moutaouakil
(74) *Attorney, Agent, or Firm* — Lee Hong Degerman Kang Waimey

(57) ABSTRACT

Disclosed is a method for performing a synchronization by a device-to-device (D2D) terminal in a wireless communication system supporting D2D communication. More particularly, a method for performing a synchronization by a D2D terminal comprises the steps of: receiving a synchronization reference signal from a first synchronization source and performing a synchronization; and, if the quality of the synchronization reference signal does not meet a predetermined standard, changing the synchronization source into a second synchronization source.

9 Claims, 9 Drawing Sheets

(52) U.S. Cl.
CPC ... *H04W 56/0005* (2013.01); *H04W 56/0015* (2013.01); *H04W 76/14* (2018.02)

(56) References Cited

U.S. PATENT DOCUMENTS

| | | | | |
|---|---|---|---|---|
| 2017/0339650 | A1* | 11/2017 | Jung | H04W 56/001 |
| 2019/0021019 | A1* | 1/2019 | Seo | H04W 24/02 |
| 2019/0306385 | A1* | 10/2019 | Sharma | G06F 21/16 |
| 2020/0029290 | A1* | 1/2020 | Kim | H04L 5/0053 |

FOREIGN PATENT DOCUMENTS

| | | |
|---|---|---|
| WO | 2015111851 | 7/2015 |
| WO | 2015115795 | 8/2015 |
| WO | 2015143170 | 9/2015 |
| WO | 2015163686 | 10/2015 |
| WO | 2015168931 | 11/2015 |

OTHER PUBLICATIONS

LG Electronics, et al., "WF on D2DSS selection", 3GPP TSG RAN WG1 Meeting #76, R1-140895, Feb. 2014, 4 pages.
European Patent Office Application Serial No. 17738682.8, Search Report dated Jul. 15, 2019, 9 pages.

\* cited by examiner

METHOD AND DEVICE FOR PERFORMING SYNCHRONIZATION BY D2D TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2017/000485, filed on Jan. 13, 2017, which claims the benefit of U.S. Provisional Application No. 62/277,972, filed on Jan. 13, 2016, the contents of which are all hereby incorporated by reference herein in their entirety.

TECHNICAL FIELD

Following description relates to a wireless communication system, and more particularly, to a method of performing synchronization in a wireless communication system supporting D2D (device to device) communication and an apparatus therefor.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

Device to device (D2D) communication refers to a communication scheme that a direct link is configured between user equipments (UEs) to allow the UEs to directly transmit and receive voice and data to and from each other without through a base station (evolved NodeB; eNB). D2D communication may include user equipment-to-user equipment (UE-to-UE) communication, peer-to-peer communication, etc. Also, the D2D communication scheme may be applied to machine-to-machine (M2M) communication, machine type communication (MTC), etc.

D2D communication is considered as a solution for solving load of a base station, which is caused by data traffic which is rapidly increased. For example, according to D2D communication, since data are transmitted and received between devices without a base station unlike the conventional wireless communication system, overload of a network may be reduced. Also, with the introduction of D2D communication, advantages of process reduction of the base station, power consumption reduction of devices which join in D2D communication, increase of data transmission rate, increase of network capacity, load distribution, cell coverage enlargement, etc. may be expected.

DISCLOSURE OF THE INVENTION

Technical Task

An object of the present invention is to provide a method for a D2D UE to perform synchronization in a wireless communication system supporting D2D (device to device) communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of performing synchronization, which is performed by a D2D (device to device) UE in a wireless communication system supporting D2D communication, includes the steps of performing synchronization by receiving a synchronization reference signal from a first synchronization source, and if quality of the synchronization reference signal fails to satisfy a prescribed reference, changing a synchronization source into a second synchronization source.

To further achieve these and other advantages and in accordance with the purpose of the present invention, according to a different embodiment, a D2D (device to device) UE performing synchronization in a wireless communication system supporting D2D communication includes a reception module and a processor, the processor configured to control the reception module to receive a synchronization reference signal from a first synchronization source, the processor configured to perform synchronization based on the synchronization reference signal, the processor, if quality of the synchronization reference signal fails to satisfy a prescribed reference, configured to change a synchronization source into a second synchronization source.

In this case, the quality of the synchronization reference signal may correspond to reception power of the synchronization reference signal received from the first synchronization source and the prescribed reference may correspond to reception power to which a prescribed hysteresis level is applied of a synchronization reference signal received from the second synchronization source.

Specifically, scaling can be performed on the reception power of the first synchronization source and the reception power of the second synchronization source to compare a reception power size of the first synchronization source with a reception power size of the second synchronization source.

And, an offset can be applied to the reception power of the first synchronization source or the reception power of the second synchronization source to compare a reception power size of the first synchronization source with a reception power size of the second synchronization source.

In this case, the hysteresis level can be determined according to whether or not the second synchronization source is able to receive the synchronization reference signal of the first synchronization source. For example, if the second synchronization source is able to receive the synchronization reference signal of the first synchronization source, the hysteresis level can be configured by a bigger value compared to a case that the second synchronization source is unable to receive the synchronization reference signal of the first synchronization source.

In addition, the step of changing the synchronization source can include the steps of operating a timer and if the quality of the synchronization reference signal fails to satisfy the prescribed reference until the timer is expired, changing a synchronization source.

Advantageous Effects

According to the present invention, a D2D UE can perform synchronization in a wireless communication system supporting D2D (device to device) communication.

It will be appreciated by persons skilled in the art that that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Figure 1:
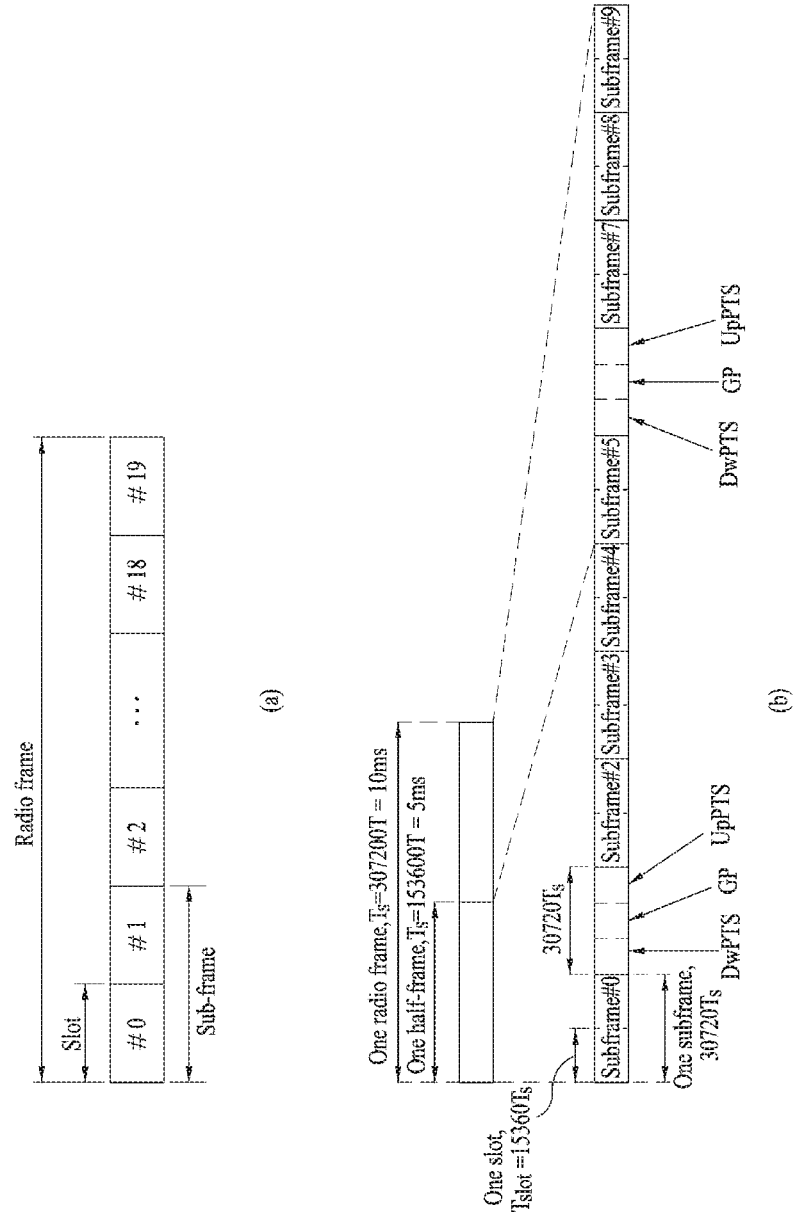
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

3GPP LTE/LTE-A System to which the Present Invention May be Applied

A structure of a radio frame will be described with reference to FIG. 1.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1ms, and one slot may have a length of 0.5 ms. One slot includes a plurality of OFDM symbols in a time domain and a plurality of resource blocks (RB) in a frequency domain. Since the 3GPP LTE system uses 01-DM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other 01-DM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
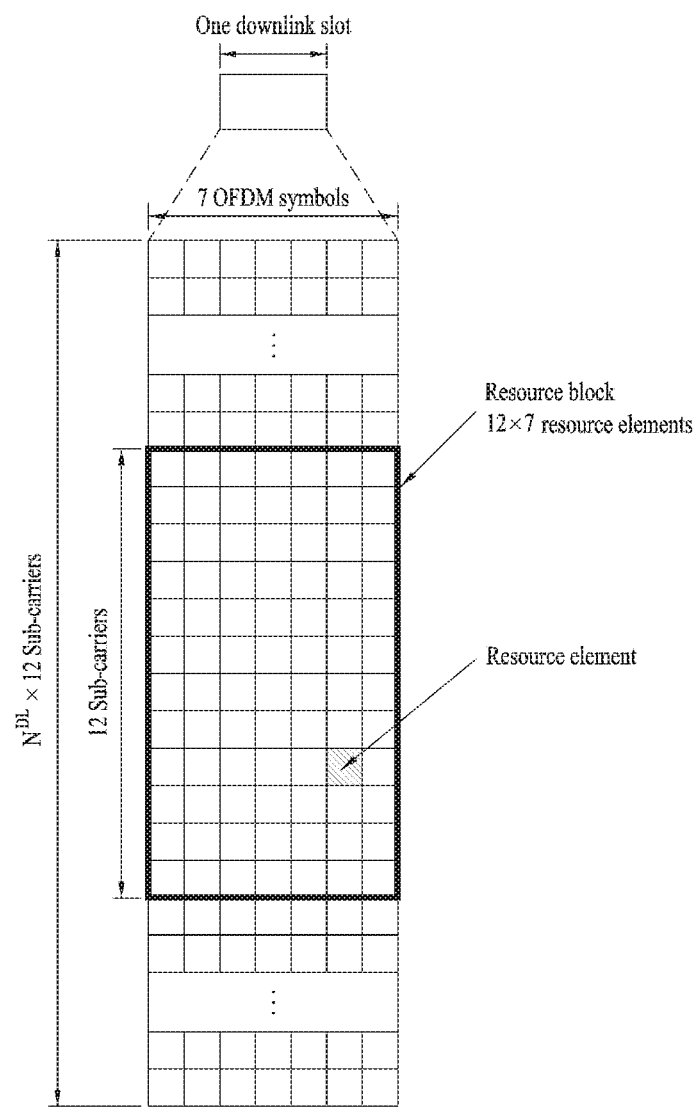
FIG. 2 is a diagram illustrating a resource grid at a downlink slot.

FIG. 2 is a diagram illustrating a resource grid at a downlink slot. One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number NDL of resource blocks (RBs) included in the downlink slot depends on a downlink transmission bandwidth. A structure of an uplink slot may be the same as that of the downlink slot.

Figure 3:
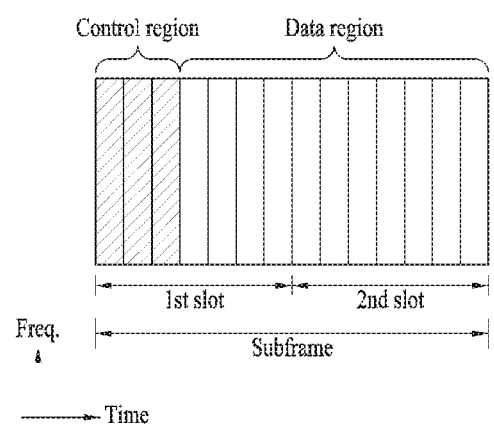
FIG. 3 is a diagram illustrating a structure of a downlink subframe.

FIG. 3 is a diagram illustrating a structure of a downlink subframe. Maximum three OFDM symbols located at the front of the first slot within the subframe correspond to a control region to which a control channel is allocated. The other OFDM symbols correspond to a data region to which a physical downlink shared channel (PDSCH) is allocated. Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control command of an individual user equipment within a random user equipment group, transmission power control information, and activation of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
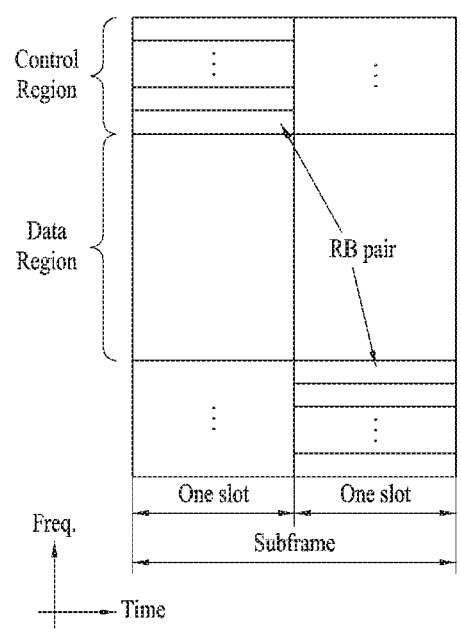
FIG. 4 is a diagram illustrating a structure of an uplink subframe.

FIG. 4 is a diagram illustrating a structure of an uplink subframe. The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

D2D (Device to Device Communication)

Figure 5:
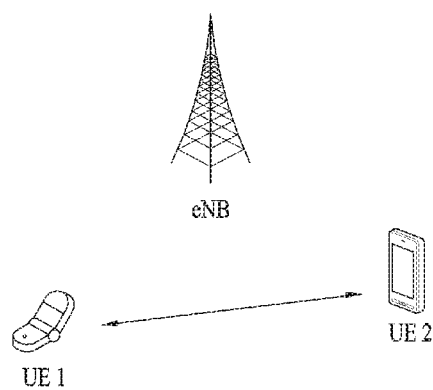
FIG. 5 is a diagram for explaining D2D communication.

FIG. 5 is a diagram for explaining D2D communication.

Referring to FIG. 5, for example, a UE may correspond to a terminal of a user. If such a network device as an eNB transmits and receives a signal according to a communication scheme between UEs, the eNB can be considered as a UE as well. A UE1 selects a resource unit corresponding to a specific resource from a resource pool corresponding to a set of resources and the UE1 transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 6:
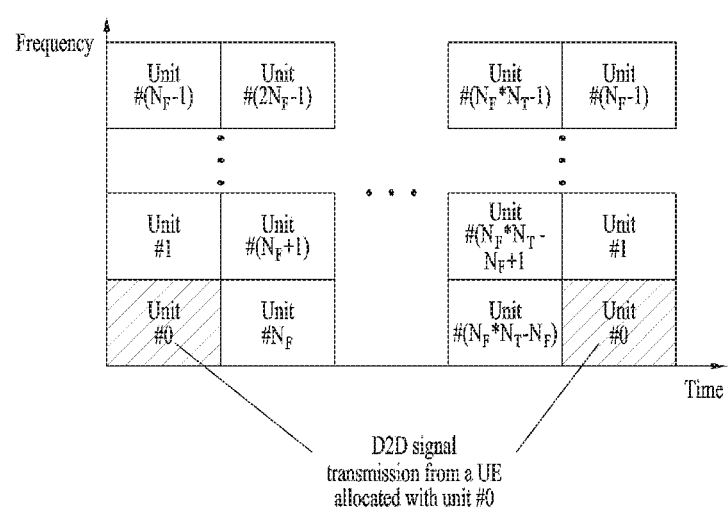
FIG. 6 is a diagram for explaining a configuration of a resource unit for performing D2D communication.

In the following, a resource configuration used in D2D communication is explained. FIG. 6 is a diagram for explaining a configuration of a resource unit for performing D2D communication.

In general, a resource pool includes a plurality of resource units. A UE selects one or more resource units from among a plurality of the resource units and may be able to use the selected resource unit(s) for D2D signal transmission. FIG. 6 illustrates one of methods for configuring resource units. Referring to FIG. 6, the entire frequency resources are divided into the $N_F$ number of resource units and the entire time resources are divided into the $N_T$ number of resource units. In particular, it is able to define $N_F*N_T$ number of resource units in total.

In this case, a resource pool can be repeated with a period of $N_T$ subframes. And, one resource unit may periodically and repeatedly appear within a resource pool. For example, resource units #0, #1, . . . , and #(NF-1) are allocated in a manner of being repeated with a period of prescribed time in a resource pool. In particular, if a resource unit #0 is allocated to a UE, the UE is able to use all resource units indexed by the resource unit #0 in a single resource pool.

And, in order for a resource unit belonging to a resource pool or the resource pool itself to obtain diversity gain in time and/or frequency domain, it may be able to configure an index of a physical resource unit to which a logical resource unit is mapped to be changed with a predetermined pattern over time. In this resource unit structure, a resource pool may correspond to a set of resource units capable of being used by a UE intending to transmit and receive a D2D signal.

In embodiments of the present invention, a resource pool for performing D2D communication can be classified into various types. First of all, the resource pool can be classified according to contents/types of a D2D signal transmitted via each resource pool. For example, the D2D signal can be classified into a scheduling assignment (SA) signal, a D2D data channel, and a discovery channel signal.

The SA signal may correspond to a signal including information on a resource position of a D2D data channel, information on MCS (modulation and coding scheme) necessary for modulating and demodulating a D2D data channel, information on a MIMO transmission scheme, information on TA (timing advance), and the like. The SA signal can be independently transmitted in a prescribed resource unit or can be transmitted in an identical resource unit in a manner of being multiplexed with D2D data. When an SA signal and data are multiplexed, an SA resource pool may correspond to a set of resource units in which the SA signal and the data are transmitted in a manner of being multiplexed. In the embodiments of the present invention, a resource unit in which an SA signal is transmitted can be referred to as an SA channel or a D2D control channel.

The D2D data channel can be defined as a set of resource units used by UEs to transmit and receive D2D data using a resource designated via the SA. The D2D data channel can be multiplexed with an SA channel And, a D2D data signal can be multiplexed without an SA signal.

If an SA signal and a D2D data channel are transmitted in a manner of being multiplexed in an identical resource unit, the D2D data channel except the SA signal can be transmitted only in a resource pool for the D2D data channel. In other word, resource units, which are used to transmit SA information in a specific resource unit of an SA resource pool, can also be used for transmitting D2D data in a resource pool for a D2D data channel.

The discovery channel corresponds to a set of resource units for transmitting a signal or a message that enables a neighboring UE to discover a transmission UE transmitting information such as ID of the UE, and the like.

In this case, an SA channel for transmitting an SA signal, a data channel for transmitting and receiving D2D data, and a discovery channel for transmitting and receiving a discovery signal can be included in a resource pool. Or, the SA channel, the D2D data channel, and the discovery channel can be configured by a separate resource pool.

Although contents of D2D signal are identical to each other, it may allocate a different resource pool according to a transmission/reception attribute of the D2D signal.

For example, in case of the same D2D data channel or the same discovery message, the D2D data channel or the discovery signal can be configured by a different resource pool according to (1) a transmission timing determination scheme (e.g., whether a D2D signal is transmitted at the time of receiving a synchronization reference signal or the timing to which a prescribed timing advance is added) of a D2D signal, (2) a resource allocation scheme (e.g., whether a transmission resource of an individual signal is designated by an eNB or an individual transmission UE selects an individual signal transmission resource from a resource pool), (3) a signal format (e.g., the number of symbols occupied by a D2D signal in a subframe, the number of subframes used for transmitting a D2D signal, etc.), (4) signal strength from an eNB, and/or (5) strength of transmit power of a D2D UE, and the like.

In the embodiments of the present invention, for clarity, a method for an eNB to directly schedule a resource region of a D2D transmission UE in D2D communication is defined as a mode 1. If a D2D transmission resource region is configured in advance or an eNB allocates the transmission resource region and a UE directly selects a resource unit for performing D2D communication from the transmission resource region, it is defined as a mode 2.

In case of performing D2D discovery, if a UE directly selects a resource unit for performing D2D discovery from a resource region configured in advance or a resource region indicated by an eNB, it is defined as a type 1. If an eNB directly schedules a resource region for a discovery channel, it is defined as a type 2.

In the embodiments of the present invention, channels for performing D2D communication can also be called as sidelink. In this case, an SA channel can also be called a PSCCH (physical sidelink control channel), a D2D synchronization signal is called a sidelink synchronization signal (SLSS), and a control channel on which most basic system information for D2D communication is broadcasted is called a physical sidelink broadcast channel (PSBCH). The SLSS can also be referred to as a PD2DSCH (physical D2D synchronization channel). And, a channel for transmitting a D2D discovery signal can be defined as a physical sidelink discovery channel (PSDCH).

According to LTE-A system (Rel-12, 13 or later) a D2D communication UE is configured to transmit PSBCH and SLSS together or transmit SLSS. LTE-A system newly defines S-RSRP to match synchronization with a different UE in D2D communication. In particular, when UEs intend to perform D2D communication, the UEs measure the S-RSRP. The UEs match synchronization with a UE of which a measurement value of the S-RSRP is equal to or greater than a specific value only and performs D2D communication. In this case, the S-RSRP can be measured from a DMRS on PSBCH. Yet, for a D2D relay operation, the S-RSRP can be measured from a DMRS on PSDCH.

An out-coverage UE measures the S-RSRP based on a DMRS of DMRS signal strength of SLSS and/or PSBCH/PSCCH/PSSCH to determine whether or not the UE becomes a synchronization source in which a D2D relay operation is to be performed.

Figure 7:
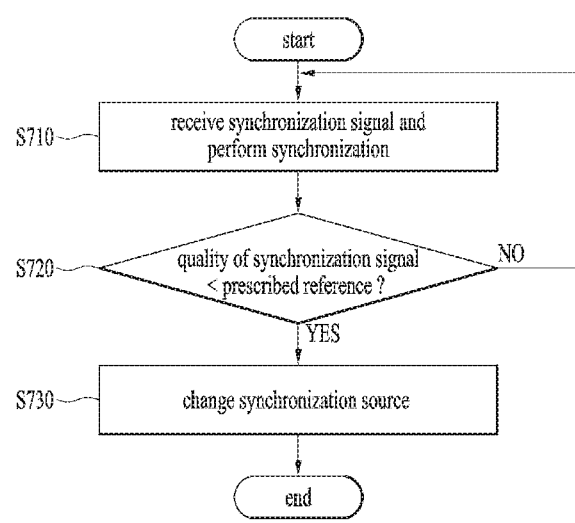
FIG. 7 is a flowchart for explaining a method of changing a synchronization source according to one embodiment of the present invention.

FIG. 7 is a flowchart for explaining a method of changing a synchronization source according to one embodiment of the present invention.

Referring to FIG. 7, a D2D UE receives a synchronization reference signal from a first synchronization source to perform synchronization in a wireless communication system supporting D2D (device to device) communication and can perform synchronization [S710]. According to one embodiment, the first synchronization source may correspond to a GNSS (global navigation satellite system). In LTE-A system (Rel-12, 13, or later), a D2D UE can configure a GNSS signal as a synchronization reference signal. For example, the D2D UE can configure the GNSS signal as the synchronization reference signal only when quality of the GSS signal is higher than a minimum requirement as much as a hysteresis level.

In order to evaluate the quality of the GNSS signal, it is necessary to have a definition on a measurement. In the following, a method of defining GNSS quality for performing D2D communication is explained.

For example, a carrier-to-noise ratio (C/N0) among 3GPP LTE standard document TS 36.355 can be used as a measurement metric. According to the present method, the measurement metric is defined using signal strength similar to a legacy RSRP from an eNB. In particular, when a plurality of satellite signals are received, if the carrier-to-noise ratio (C/N0) of the signals is equal to or greater than a prescribed threshold, it is determined as the satellite signals are received well and the signals can be used as a time and/or frequency reference.

Meanwhile, when a satellite moves very fast, if a satellite signal of which Doppler is big (C/N0 is big) is used, a UE may transceive a communication signal with other UEs with reference to an incorrect frequency reference. In this case, the UE may cause a big time/frequency error to other UEs and generate interference. Moreover, due to the time/frequency considerably different from that of other UEs, the UE may receive interference. In order to solve the problem above, the present invention proposes a method of using a carrier-to-noise ratio (C/N0) as a GNSS measurement for performing communication between UEs only when a satellite signal has an absolute value of Doppler measurement less than a prescribed threshold. In terms of implementation, Doppler can measure a Doppler frequency or a Doppler frequency shift of a satellite signal using a carrier phase difference. If Doppler is equal to or greater than a prescribed threshold, it may not use a carrier-to-noise (C/N0) as timing or frequency reference no matter how a carrier-to-noise ratio is big. In other word, a carrier-to-noise (C/N0) can be used as a measurement metric only when an absolute value of a Doppler measurement of a satellite signal is less than a prescribed threshold by utilizing 3GPP LTE standard document TS 36.355.

As a different example, an ADR (accumulated delta-range) of 3GPP LTE standard document TS 36.355 may correspond to a barometer indicating a distortion of a received satellite signal. For example, the present invention proposes a method of using a satellite signal of which the ADR is less than a prescribed threshold only as a GNSS measurement for performing D2D communication.

As a further different example, mpathDet of 3GPP LATE standard document TS 36.355 may correspond to an indicator indicating a distortion of a received satellite signal. For example, when GNSS measurement for performing D2D communication is defined, a measurement of which a value of the mpathDet is equal to or greater than a prescribed threshold can be excluded.

Meanwhile, in the aforementioned GNSS measurement information, each measurement relates to each of satellites. When one or more satellite signals are received, one selected from the group consisting of an average value of values measured by each of the satellites, a maximum value, a minimum value, an average value of the N number of top measurement values, an average value of the N number of lower measurement values, an $N^{th}$ value from the top measurement value, an $N^{th}$ value from the bottom measurement value, and a median value can be defined as a representative measurement for using GNSS as a time and/or frequency reference (or performing D2D communication). For example, since GNSS measurement for performing D2D communication is not used for searching for a location, if one of a plurality of satellite signals is received with a sufficient carrier-to-noise ratio (C/N0), there is no problem in using the received satellite signal as a time reference for performing D2D communication. Hence, the maximum value among the measurements of many satellite signals can be used as a representative measurement value. Or, when a single satellite signal is seen only, since it is unable to guarantee timing accuracy for the satellite signal, an average value of the N number of top measurement values can be defined as a representative measurement. However, as mentioned in the foregoing description, if Doppler is equal to or greater than a prescribed threshold, the Doppler can be excluded from representative measurement calculation. This is because, since Doppler shift excludes a large satellite signal, it is able to secure a more stable time/frequency reference.

As a further different example, it may combine the aforementioned methods with each other. For example, when a GNSS measurement for performing D2D communication is defined, an average value of a carrier-to-noise ratio (C/N0) can be used as GNSS measurement for performing D2D communication among satellite signals that an absolute value of Doppler and/or ADR and/or mpathDet is less than a prescribed threshold. In this case, the threshold for the absolute value of Doppler and/or the ADR and/or the mpathDet can be determined in advance or can be signaled via physical layer or higher layer signaling.

As a further different example, when one or more satellite signals are received, a time/frequency weighted sum of satellite signals, which are used for determining a representative measurement, can be used as a reference for transmitting and/or receiving a D2D communication signal. In this case, it may use a weight factor using a value resulted from dividing a carrier-to-noise ratio (C/N0) of each satellite signal by the sum of carrier-to-ratio values of satellite signals used for determining a representative measurement. In particular, it may put a bigger weight on a time/frequency of a satellite signal of which signal strength is strong.

As a different embodiment, if a UE is equipped with a high-precision atomic clock, it is able to transmit and receive a D2D communication signal with reference to the time of the UE without using a signal of GNSS. In this case, since other UEs may not have the high-precision atomic clock, the UE may transmit and receive a signal on the basis of timing of other UEs to enable other UEs to receive the signal. However, in this case, it is not necessary for the UE to turn a GNSS receiver on all the time. The UE wakes up from time to time, receives a GNSS signal, and may be able to adjust timing. If the UE is equipped with the high-precision atomic clock, the UE can always configure GNSS measurement by a maximum value. In particular, it is not necessary to define or perform a separate measurement for the UE equipped with the high-precision atomic clock. Instead, the GNSS measurement is always configured by the maximum measurement to make the UE always determine that measurement quality of GNSS is good.

In LTE-A system (Rel-12, 13, or later), D2D synchronization hysteresis is defined as follows.

TABLE 1

| SL-Preconfiguration field descriptions |
| --- |
| carrierFreq |
| Indicates the carrier frequency for sidelink operation. In case of FDD it is uplink carrier frequency and the corresponding downlink frequency can be determined from the default TX-RX frequency separation defined in TS 36.101 [42, table 5.7.3-1]. |
| preconfigComm |
| Indicates a list of resource pools. The first resource pool in the list is used for both reception and transmission of sidelink communication. The other resource pools, if present, are only used for reception of sidelink communication. |
| syncRefDiffHyst |
| Hysteresis when evaluating a SyncRef UE using relative comparison. Value dB0 corresponds to 0 dB, dB3 to 3 dB and so on, value dBinf corresponds to infinite dB. |
| syncRefMinHyst |
| Hysteresis when evaluating a SyncRef UE using absolute comparison. Value dB0 corresponds to 0 dB, dB3 to 3 dB and so on. |

A D2D UE can perform synchronization as follows.

Out of Coverage

According to 3GPP LTE standard document TS 36.304 [4, 11.4], if a D2D UE deviates from a frequency range (coverage), the D2D UE performs synchronization using one of methods described in the following.

The D2D UE performs the full search (i.e., including all subframes and all available SLSSIDs) to discover a candidate SLSS according to 3GPP LTE standard document TS 36. 133.

When one or more sensed SLSSIDs are evaluated, layer-3 filtering designated in 3GPP LTE standard document TS 36.304 [5.5.3.2] is applied using a preconfigured filter coefficient defined in 3GPP LTE standard document TS 36.304 [9.3] before S-RSRP measurement result is used.

When a UE selects a SynchRef UE: (i) if S-RSRP of the strongest candidate SynchRef UE exceeds a minimum requirement defined in 3GPP LTE standard document TS 36.133 by syncRefMinHyst and the strongest candidate SynchRef UE belongs to a priority group identical to that of S-RSRP of a current SynchRef UE and the strongest candidate, Synch UE exceeds the S-RSRP of the current SynchRef UE by synchRefDiffHyst, (ii) if the S-RSRP of the candidate SynchRef UE exceeds a minimum requirement defined in 3GPP LTE standard document TS 36.133 by syncRefMinHyst and the candidate SynchRef UE belongs to a priority group higher than that of the current SyncRef UE, or (iii) if the S-RSRP of the current SyncRef UE is smaller than a minimum necessary condition defined in 3GPP LTE standard document TS 36.133, it is determined as SyncRef UE is not selected.

When a UE does not select a SynchRef UE: (1) if a UE exceeds a minimum requirement defined in 3GPP LTE standard document TS 36.133 by synchRefMinHyst and 5-RSRP, which has received MasterinformationBlock-SL message (candidate SynchRef UE), discovers one or more SLSSIDs, SynchRef UE is selected according to a priority described in the following.

(1) A UE configured as TRUE from a UE having an S-RSRP result (priority group 1) of which inCoverage included in MasterinformationBlock-SL message received from the UE is highest.

(2) A UE corresponding to a part of a set in which SLSSID is defined in coverage starting from a UL (priority group 2) having the highest S-RSRP result.

(3) Other UEs starting from a UE having the highest S-RSRP result (priority group 3).

In Coverage

Meanwhile, if a GNSS is included in a V2X synchronization source and is located in coverage, a network can inform a UE of one of the GNSS and timing of an eNB to which a higher priority is to be applied. In this case, when the eNB configures the GNSS by a higher priority, if a GNSS signal equal to or greater than a prescribed threshold is not received, an eNB signal can be configured as a timing reference. On the contrary, when the eNB configures an eNB signal by a higher priority, if the eNB signal is not received during prescribed time, the GNSS can be configured as a timing reference by a UE. However, if the timing reference is too frequently configured, it is difficult to smoothly perform D2D communication and serious interference may occur at a cellular network. Moreover, since a network allocates a resource region by dividing the resource region based on two different timing, resource efficiency can be degraded. In the following, a method of changing a synchronization source between GNSS and an eNB is explained.

A UE determines whether or not quality of a synchronization reference signal satisfies a prescribed reference to change a synchronization source [S720]. According to one embodiment, the quality of the synchronization reference signal may correspond to reception power of a synchronization reference signal received from a first synchronization source. In this case, for example, the prescribed reference may correspond to reception power of a synchronization reference signal received from the second synchronization source to which a prescribed hysteresis level is applied. As a different example, the prescribed reference may correspond to a time error or a frequency error of the synchronization reference signal. If the quality of the synchronization reference signal fails to satisfy the prescribed reference, a D2D UE can change a synchronization source into the second synchronization source [S730].

For example, when a UE uses a GNSS as a first synchronization source, if reception power of a different synchronization source is greater than a value of reception power of the GNSS to which a hysteresis level is added, the UE can change a synchronization source. For example, when E-UMTS (Evolved Universal Mobile Telecommunication System) eNB is used as a second synchronization source, a synchronization source can be changed to the second synchronization source from a first synchronization source according to reception power of GNSS and a hysteresis level.

In this case, a network can signal a minimum hysteresis level and/or a difference hysteresis level to a UE via higher layer signaling and it may be able to set hysteresis levels to the UE. For example, in case of applying the hysteresis level, when a specific UE receives a GNSS signal with quality equal to or greater than a prescribed threshold, although reception power of the GNSS is instantaneously deteriorated, it may not switch to a different synchronization source. In particular, a synchronization source is changed only when GNSS signal quality is deteriorated more than a hysteresis level to prevent a timing reference from being frequently changed.

As a different example, it may assume that E-UMTS eNB is used as a first synchronization source and a GNSS is used as a second synchronization source. In this case, it may also apply a hysteresis to reception power of an eNB. In this case, the hysteresis corresponds to a hysteresis for maintaining timing of the eNB to a certain level irrespective of a hysteresis for performing handover or reporting. In particular, once the timing of the eNB is used, the timing of the eNB can be maintained until a hysteresis level becomes less than a hysteresis level configured in advance or signaled by a network.

According to one embodiment, in order to compare a reception power size of a first synchronization source with a reception power size of a second synchronization source, it may be able to apply size scaling to each of the reception powers. Or, it may be able to apply an offset to the reception power of the first synchronization source or the reception power of the second synchronization source. In this case, for example, the first synchronization source may correspond to a GNSS (global navigation satellite system) and the second synchronization source may correspond to an E-UMTS (evolved universal mobile telecommunication system) eNB. Specifically, in order to compare reception power of a signal received from the GNSS with reception power of a signal received from the eNB, it is necessary to convert the reception powers with the same scale. Currently, RSRP of an eNB is represented in a unit of watt. In order to compare the RSRP with a carrier-to-noise ratio (C/N0), it is necessary to consider a noise term. A relation between a carrier-to-noise ratio (C/N0) and a signal-to-noise ratio (SNR) can be summarized as follows.

In general, an SNR is represented by dB (decibels). As show in the following, the SNR indicates a ratio of signal power to noise power in a given bandwidth.

$$SNR(\text{dB}) = S - N \quad \quad \text{[Equation 1]}$$

In this case, S denotes signal power. In general, the signal power corresponds to carrier power represented in a unit of decibel/miliwatt (dBm) or decibel/watt (dBW). And, N denotes noise power in a given bandwidth represented in a unit of dBm or dBW.

On the contrary, $C/N_0$ is represented by decibel-Hertz (dB-Hz) in general. The C/N0 indicates a ratio of carrier power per unit bandwidth to noise power.

In case of a GPS L1 C/A signal, it may consider signal power received as power of original non-modulated carrier power which is spread by a spreading code or a ranging code when the GPS L1 C/A signal is transmitted from a satellite. C/N0 can be represented as equation 2 in the following.

$$C/N_0(\text{dB-}Hz) = C - (N - BW) = C - N_0 = SNR + BW \quad \quad \text{[Equation 2]}$$

In this case, C corresponds to carrier power in a unit of dBm or dBW, N corresponds to noise power in a unit of dBm or dBW, NO corresponds to noise power density in a unit of dBm-Hz or dBW-Hz, and a BW corresponds to a bandwidth of observation corresponding to a noise equivalent bandwidth of the last filter stage at an RF front end of a receiver.

A unique value of an L1 C/A code receiver is described in the following.

/$N_0$: ~37 to 45 dB-Hz

Front-end band of receiver: ~4 MHz=>BW=10*log (4,000,000)=66 dB

SNR=C/$N_0$–BW=>SNR~(37-66) to (45-66)=>SNR~−29 dB to −21 dB

In order to determine the C/$N_0$, it is necessary to determine carrier power and noise density as an input inputted to a receiver.

In this case, a measurement of an eNB can be used by scaling RSRQ. Or, RSRP is divided by noise power or PSD (power spectral density) and it may use the divided RSRP by scaling the divided RSRP. More specifically, similar to the carrier to noise ratio (C/$N_0$), SNR per unit BW is measured and BW of GNSS can be added to compare the GNSS with a next GNSS. Or, similar to the C/$N_0$, a signal of an eNB may use a value resulted from dividing reception power by a PSD of noise.

A method of comparing a signal-to-noise ratio with a carrier-to-noise ratio (C/$N_0$) is described in the following.

Method 1

A signal-to-noise ratio (SNR) can be represented by a symbol written in 3GPP LTE standard document TS 36.101. $\hat{E}_s/N_{oc}$ or a value obtained by applying scaling of a prescribed size or an offset to the $\hat{E}_s/N_{oc}$ can be used as a measurement of an eNB.

In this case, the $\hat{E}_s$ and the $N_{oc}$ can be defined as follows. In this case, it may use $N_{oc1}$, $N_{oc2}$, $N_{oc3}$, $N_{oc}'$ instead of the $N_{oc}$.

$\hat{E}_s$: The averaged received energy per RE of the wanted signal during the useful part of the symbol, i.e. excluding the cyclic prefix, at the UE antenna connector; average power is computed within a set of REs used for the transmission of physical channels (including user specific RSs when present), divided by the number of REs within the set, and normalized to the subcarrier spacing.

$N_{oc}$: The power spectral density of a white noise source (average power per RE normalised to the subcarrier spacing), simulating interference from cells that are not defined in a test procedure, as measured at the UE antenna connector.

$N_{oc1}$: The power spectral density of a white noise source (average power per RE normalized to the subcarrier spacing), simulating interference in non-CRS symbols in ABS subframe from cells that are not defined in a test procedure, as measured at the UE antenna connector.

$N_{oc2}$: The power spectral density of a white noise source (average power per RE normalized to the subcarrier spacing), simulating interference in CRS symbols in ABS subframe from all cells that are not defined in a test procedure, as measured at the UE antenna connector.

$N_{oc3}$: The power spectral density of a white noise source (average power per RE normalised to the subcarrier spacing), simulating interference in non-ABS subframe from cells that are not defined in a test procedure, as measured at the UE antenna connector.

$N_{oc}'$: The power spectral density (average power per RE normalised to the subcarrier spacing) of the summation of the received power spectral densities of the strongest interfering cells explicitly defined in a test procedure plus $N_{oc}$, as measured at the UE antenna connector. The respective power spectral density of each interfering cell relative to $N_{oc}'$ is defined by its associated DIP value, or the respective power spectral density of each interfering cell relative to $N_{oc}$ is defined by its associated Es/$N_{oc}$ value.

According to the abovementioned definition, $\hat{E}_s/N_{oc}$ becomes SNR per Hz. In order to compare the $\hat{E}_s/N_{oc}$ with carrier-to-noise ratio (C/$N_0$), it may add a bandwidth of a GNSS. In this case, it may be able to introduce scaling or offset irrespective of a simple bandwidth. This is because timing/frequency error performance varies when a GNSS signal is received and an eNB signal is received. And, since a receiver receiving an eNB signal is different from a receiver receiving a GNSS signal, it may be able to apply scaling/offset in consideration of the characteristic of each receiver. When scaling or offset value is applied to SNR of an eNB signal (to compare the eNB signal with a GNSS measurement C/$N_0$), it may be able to configure the scaling or the offset value with a different value according to a UE when a UE is implemented. Or, a network may set a common value to UEs in advance. If a UE is unable to receive a signal from a network, it may be able to configure the scaling or the offset value with a specific value in advance.

Method 2

It may be able to apply scaling or offset to an eNB measurement defined in 3GPP LTE standard document TS 36.214 to use the eNB measurement as a measurement. For example, it may use RSRP or RSRQ.

For example, in order to use the RSRP, it is necessary to perform normalization on reception power of watt unit in a unit of Hz. Subsequently, if normalization is performed on PSD of noise, it is able to obtain SNR per Hz. In order to compare the SNR per Hz with carrier-to-noise ratio (C/$N_0$), it may apply a corresponding offset to a BW. Due to the normalization operation and the reasons mentioned earlier in the method 1, it may be able to introduce a scaling value or an offset to a value resulted from dividing RSRP by PSD of noise. Similarly, the scaling value or the offset may correspond to a value individually determined according to a UE, a value determined in advance, or a value signaled by a network.

As a different example, it may utilize an RSRQ value. Since a noise term is already included in the RSRQ, the RSRQ value can be utilized. However, it is necessary to have offset and/or a scaling value to compare the RSRQ value with a carrier-to-noise ratio (C/$N_0$). This is because not only noise but also an interference term is included in a denominator of the RSRQ. An equation for converting the RSRQ into SINR is described in the following. The RSRQ can be compared with a GNSS measurement by converting the RSRQ into SINR.

$$SINR = \frac{1}{\frac{1}{12*RSRQ} - x} \qquad \text{[Equation 3]}$$

In this case, x corresponds to the number of REs per resource block of a corresponding cell.

In this case, unlike SNR or C/$N_0$, the SINR or the RSRQ value may have a different range. Hence, it may compare the SINR or the RSRQ value with the C/$N_0$ by introducing scaling and/or offset. Similarly, it may compare the SINR or the RSRQ with a measurement value of GNSS by introducing scaling and/or an offset value. In this case, the scaling and/or the offset value can be determined in advance or can be signaled by a network. The scaling and/or the offset value can be implemented by a different value according to a UE.

As a different example, similar to the RSRP, it is also necessary to perform normalization on a legacy S-RSRP with scaling and/or offset and/or power of noise and/or PSD to compare the legacy S-RSRP with a measurement of GNSS. The scaling and/or the offset value applied to the S-RSRP can be determined in advance or can be signaled by a network.

As a further different example, the present invention proposes a method of applying scaling and/or offset to a measurement of GNSS ($C/N_0$) instead of a method of changing a measurement of a legacy eNB or a UE. The C/N0 of the GNSS corresponds to a value resulted from dividing signal power by PSD of noise. The $C/N_0$ of the GNSS is converted into average reception power by multiplying the $C/N_0$ of the GNSS by the noise PSD. In this case, scaling and/or offset value which is applied to compare the measurement of GNSS with RSRP is different from scaling and/or offset value which is applied to compare the measurement of GNSS with S-RSRP. This is because an RS position and the number of REs are differently used in the RSRP and the S-RSRP.

According to one embodiment, a hysteresis level can be determined according to whether or not the second synchronization source is able to receive a synchronization reference signal of the first synchronization source. For example, if the second synchronization source is able to receive a synchronization reference signal of the first synchronization source, the hysteresis level can be configured by a bigger value compared to a case that the second synchronization source is unable to receive a synchronization reference signal of the first synchronization source. In this case, for example, the first synchronization source corresponds to a GNSS (global navigation satellite system) and the second synchronization source may correspond to an E-UMTS (Evolved Universal Mobile Telecommunication System) eNB. Specifically, a hysteresis level of the GNSS/eNB can be differently configured according to deployment of a network. For example, in case of an asynchronous network where timing is different according to an eNB, in order for UEs, which have configured the GNSS as a timing reference, to maintain the GNSS for a long time, a hysteresis level of the GNSS can be configured by a bigger value. In particular, if the UEs receive the GNSS at least one time, although GNSS signal quality is deteriorated, the UEs can maintain the GNSS timing for a long time. As a different example, in case of a synchronous network, since timing of an eNB is aligned, it may be able to configure a hysteresis level of the eNB to be big to reduce an impact on a cellular.

The hysteresis level of the GNSS/eNB can be differently configured according to GNSS reception capability of the eNB. For example, if the eNB has capability capable of receiving a GNSS signal, a hysteresis level of the eNB is configured to be big to make the timing of the eNB to be maintained for a long time. As a different example, if the eNB does not have capability capable of receiving a GNSS signal, the hysteresis level of the eNB is configured to be small to make the eNB follow the timing of the GNSS.

As a further different embodiment, as mentioned in the foregoing description, if a UE is able to induce timing/frequency within a prescribed error from the GNSS based on RAN 4 requirement without specifically defining a measurement of the GNSS, it may be able to configure the GNSS to be used as a synchronization source. In this case, if an eNB prioritizes the GNSS, it may be able to configure the UE to use the timing of the eNB under the assumption that the GNSS is unavailable only when it is anticipated that the timing/frequency induced from the GNSS exceeds a prescribed error.

Figure 8:
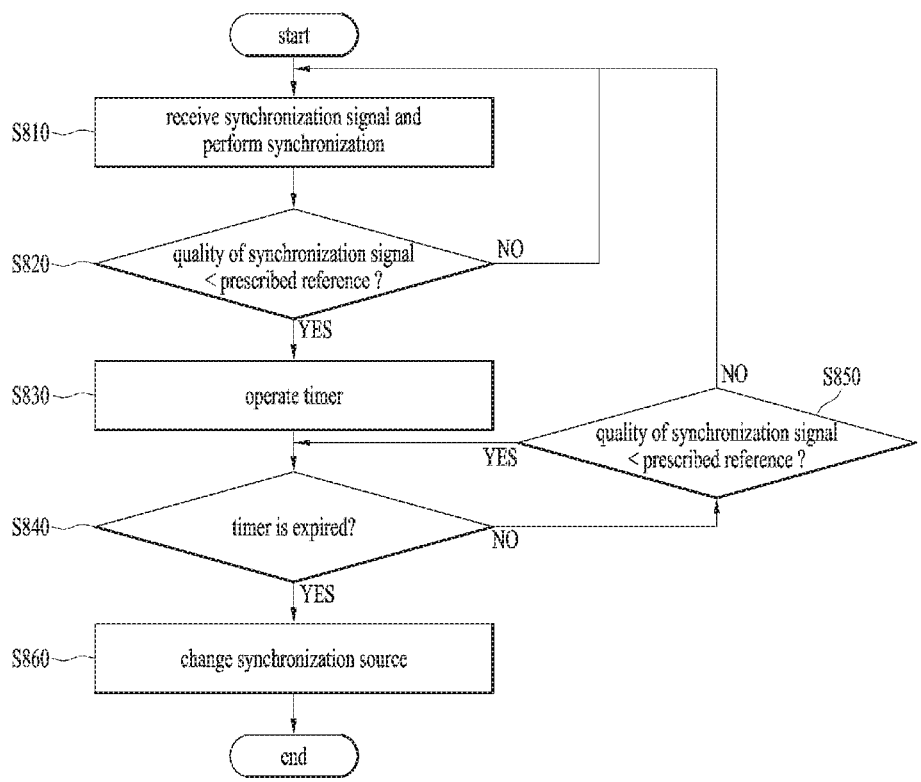
FIG. 8 is a flowchart for explaining a method of changing a synchronization source according to a different embodiment of the present invention.

FIG. 8 is a flowchart for explaining a method of changing a synchronization source according to a different embodiment of the present invention. Referring to FIG. 8, a D2D UE receives a synchronization reference signal from a first synchronization source to perform synchronization in a wireless communication system supporting D2D (device to device) communication and can perform synchronization [S810]. According to one embodiment, the first synchronization source may correspond to a GNSS (global navigation satellite system). In LTE-A system (Rel-12, 13, or later), a D2D UE can configure a GNSS signal as a synchronization reference signal. For example, the D2D UE can configure the GNSS signal as the synchronization reference signal only when quality of the GNSS signal is higher than a minimum requirement as much as a hysteresis level. In order to evaluate the quality of the GNSS signal, it is necessary to have a definition on a measurement. The definition on the measurement is identical to the description of FIG. 7. Hence, explanation on the definition is omitted at this time.

Subsequently, the UE determines whether or not the quality of the synchronization reference signal satisfies a prescribed reference to change a synchronization source [S820]. According to one embodiment, the quality of the synchronization reference signal may correspond to reception power of the synchronization reference signal received from the first synchronization source. And, the prescribed reference may correspond to reception power of a synchronization reference signal received from the second synchronization source to which a prescribed hysteresis level is applied.

If the quality of the synchronization reference signal fails to satisfy the prescribed reference, the UE may operate a timer [S830]. For example, if the quality of the synchronization reference signal fails to satisfy the prescribed reference while a signal of a specific synchronization source equal to or greater than a prescribed threshold is received, the UE can operate the timer. It may be able to consistently measure quality of the signal while the timer operates [S850]. If the quality of the signal does not exceeds the threshold until the timer is expired, the UE may select a synchronization source again or select a second best different synchronization source. For example, if the UE fails to receive a GNSS signal equal to or greater than a prescribed threshold, the UE operates the timer. If the UE fails to receive a GNSS signal while the timer operates, the UE may perform an operation of reselecting a synchronization source. This is because, although signal reception quality of a GNSS is poor (although the UE fails to receive a GNSS signal), the UE is able to maintain a clock within a specific error range during a certain amount of time.

In this case, the step of determining the synchronization signal quality [S820] and the step of changing a synchronization source [S860] may be identical to the step of determining the synchronization signal quality [S720] and the step of changing a synchronization source [S730]. Hence, explanation on the steps is omitted at this time.

As a different embodiment, it may apply a hysteresis and a timer at the same time. In this case, the hysteresis is applied to maintain a specific synchronization source and prevent a timing changing operation from being frequently performed. The timer is applied to change a synchronization source with a better synchronization source when a measurement is deteriorate for a long time (e.g., although a measurement is less than a threshold and is greater than 'threshold–hysteresis', the measurement is staying at the region for a long time)

Figure 9:
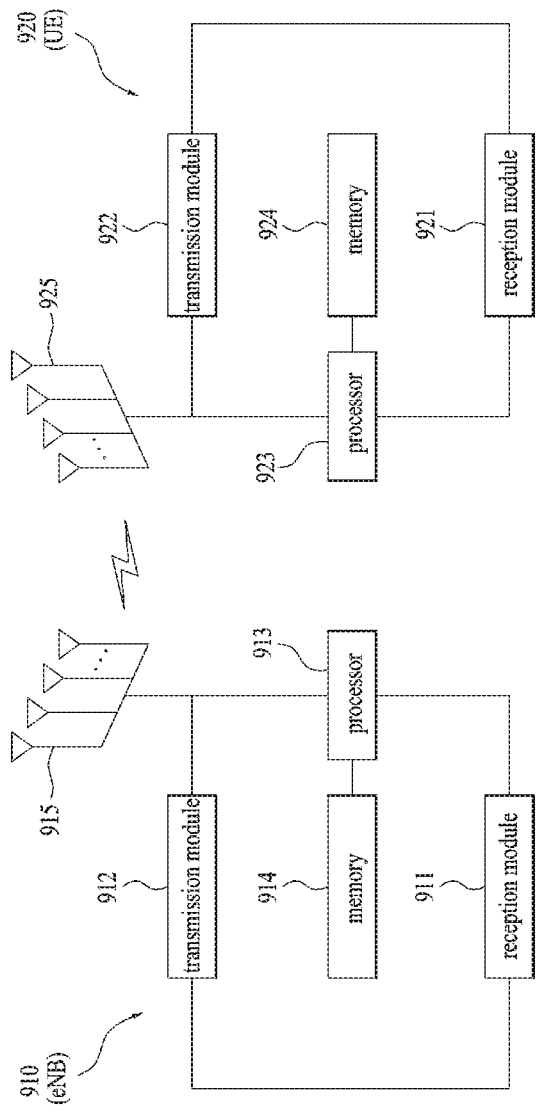
FIG. 9 is a diagram for configurations of devices according to one embodiment of the present invention.

FIG. 9 is a diagram illustrating a configuration of a base station and a user equipment according to the embodiment of the present invention.

Referring to FIG. 9, the base station 910 according to the present invention may include a reception module 911, a transmission module 912, a processor 913, a memory 914, and a plurality of antennas 915. The plurality of antennas 915 mean the base station that supports MIMO transmission and reception. The reception module 911 may receive various kinds of signals, data and information on an uplink from the user equipment. The transmission module 912 may transmit various kinds of signal, data and information on a downlink to the user equipment. The processor 913 may control the overall operation of the base station 910.

The processor 913 of the base station 910 according to one embodiment of the present invention may process requirements in the aforementioned embodiments.

In addition, the processor 913 of the base station 910 performs an operation for information received by the base station 910, information to be transmitted to the outside, etc., and the memory 914 may store the operation processed information for a predetermined time and may be replaced with an element such as a buffer (not shown).

Subsequently, referring to FIG. 9, the user equipment 920 of the present invention may include a reception module 921, a transmission module 922, a processor 923, a memory 924, and a plurality of antennas 925. The plurality of antennas 925 mean the user equipment that supports MIMO transmission and reception. The reception module 921 may receive various kinds of signals, data and information on a downlink from the base station. The transmission module 922 may transmit various kinds of signal, data and information on an uplink to the base station. The processor 923 may control the overall operation of the user equipment 920.

The processor 923 of the user equipment 920 according to one embodiment of the present invention may process requirements in the aforementioned embodiments.

In addition, the processor 923 of the user equipment 920 performs an operation for information received by the user equipment 920, information to be transmitted to the outside, etc., and the memory 924 may store the operation processed information for a predetermined time and may be replaced with an element such as a buffer (not shown).

The details of the aforementioned base station and the aforementioned user equipment may be configured in such a manner that the aforementioned various embodiments of the present invention may independently be applied to the aforementioned base station and the aforementioned user equipment, or two or more embodiments may simultaneously be applied to the aforementioned base station and the aforementioned user equipment, and repeated description will be omitted for clarification.

Also, in the description of FIG. 9, the description of the base station 910 may equally be applied to a relay station as a downlink transmission entity or an uplink reception entity, and the description of the user equipment 920 may equally be applied to a relay station as a downlink reception entity or an uplink transmission entity.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless communication systems.

What is claimed is:

1. A method of performing synchronization, which is performed by a device to device (D2D) user equipment (UE) in a wireless communication system supporting D2D communication, comprising the steps of:
receiving a synchronization reference signal from a synchronization source;
performing synchronization with the synchronization source based on the received synchronization reference signal; and
reselecting the synchronization source based on a quality of the synchronization reference signal that does not satisfy a requirement criterion for a predetermined time,
wherein the predetermined time is configured differently based on whether the synchronization source is a Global Navigation Satellite System (GNSS) or a base station, and
wherein the predetermined time is configured longer for the GNSS than for the base station.

2. The method of claim 1,
wherein the quality of the synchronization reference signal corresponds to a reception power of the synchronization reference signal received from the synchronization source, and
wherein the requirement criterion corresponds to a synchronization reference signal reception power to which a prescribed hysteresis level is applied.

3. The method of claim 2, wherein scaling is performed on the reception power of the synchronization reference signal of the GNSS and the reception power of the synchronization reference signal of the base station to reselect the synchronization source.

4. The method of claim 2, wherein an offset is applied to the reception power of the synchronization reference signal of the GNSS or the reception power of the synchronization reference signal of the base station to reselect the synchronization source.

5. The method of claim 1, wherein the base station corresponds to an evolved universal mobile telecommunication system, E-UMTS, eNB.

6. A device to device (D2D) user equipment (UE) performing synchronization in a wireless communication system supporting D2D communication, comprising:
a reception module; and
a processor,
wherein the processor configured to:
control the reception module to receive a synchronization reference signal from a synchronization source,
perform synchronization with the synchronization source based on the received synchronization reference signal, and
reselect the synchronization source based on a quality of the synchronization reference signal that does not satisfy a requirement criterion for a predetermined time,
wherein the predetermined time is configured differently based on whether the synchronization source is a Global Navigation Satellite System (GNSS) or a base station, and
wherein the predetermined time is configured longer for the GNSS than for the base station.

7. The D2D UE of claim 6,
wherein the quality of the synchronization reference signal corresponds to a reception power of the synchronization reference signal received from the synchronization source, and
wherein the requirement criterion corresponds to a synchronization reference signal reception power to which a prescribed hysteresis level is applied.

8. The D2D UE of claim 7, wherein scaling is performed on the reception power of the synchronization reference signal of the GNSS and the reception power of the synchronization reference signal of the base station to reselect the synchronization source.

9. The D2D UE of claim 7, wherein an offset is applied to the reception power of the synchronization reference signal of the GNSS or the reception power of the synchronization reference signal of the base station to reselect the synchronization source.

* * * * *